Aug. 28, 1945.  L. F. BEACH  2,383,459
INDICATOR FOR MAGNETIC FIELDS
Filed July 30, 1940  3 Sheets-Sheet 2
Fig. 5
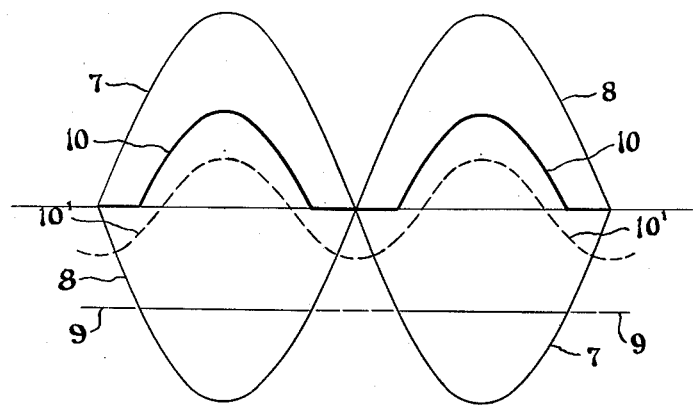
Fig. 4
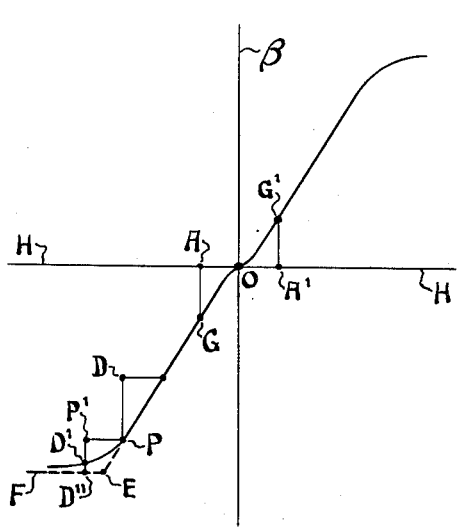
Fig. 6
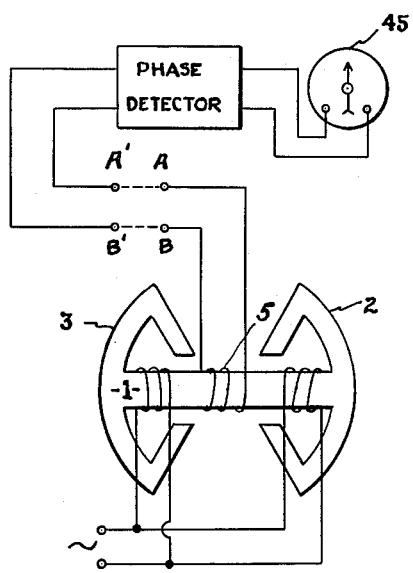
Fig. 7
INVENTOR
Lennox F. Beach
BY
Herbert H. Thompson
his ATTORNEY.

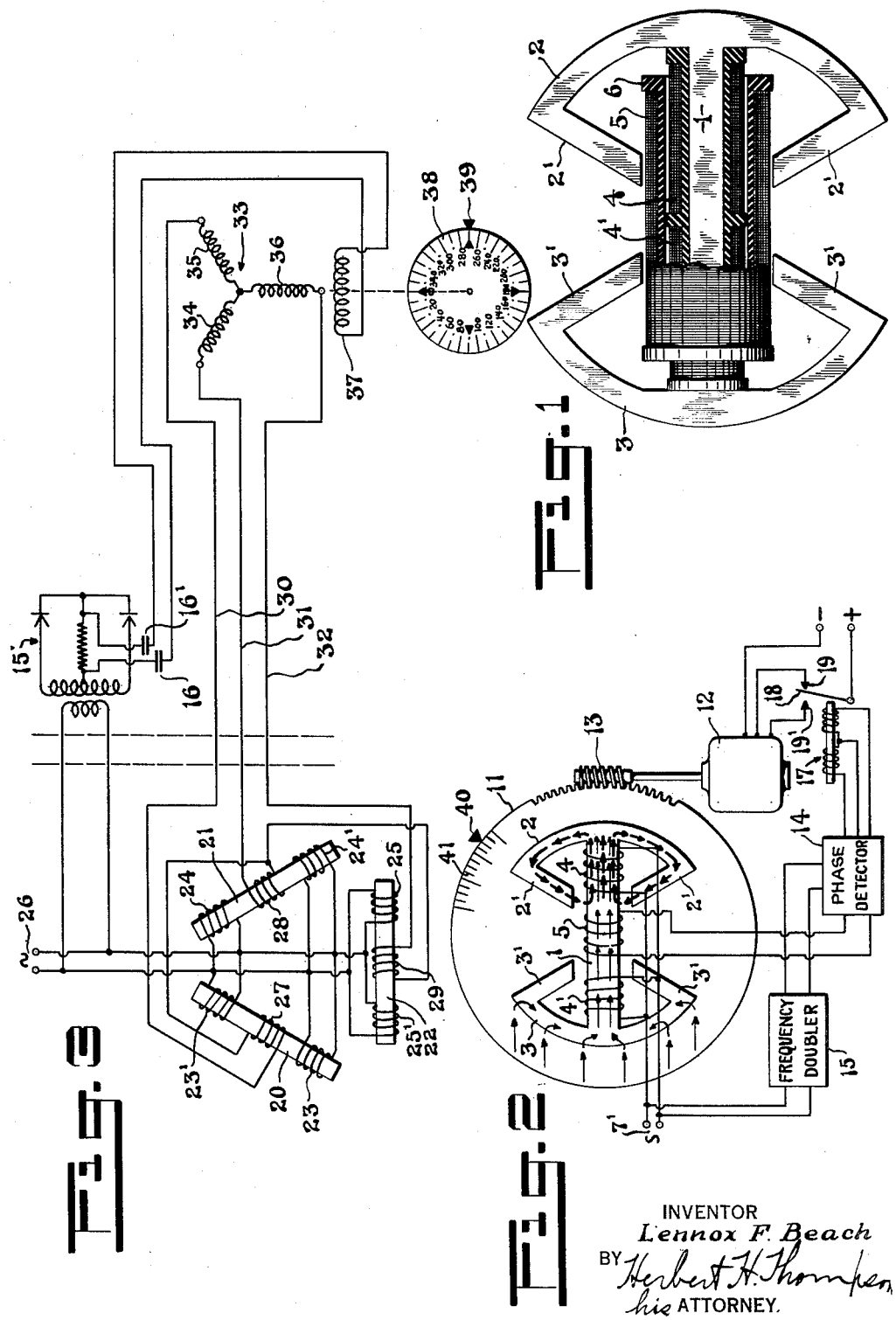

Aug. 28, 1945.   L. F. BEACH   2,383,459
INDICATOR FOR MAGNETIC FIELDS
Filed July 30, 1940   3 Sheets-Sheet 3
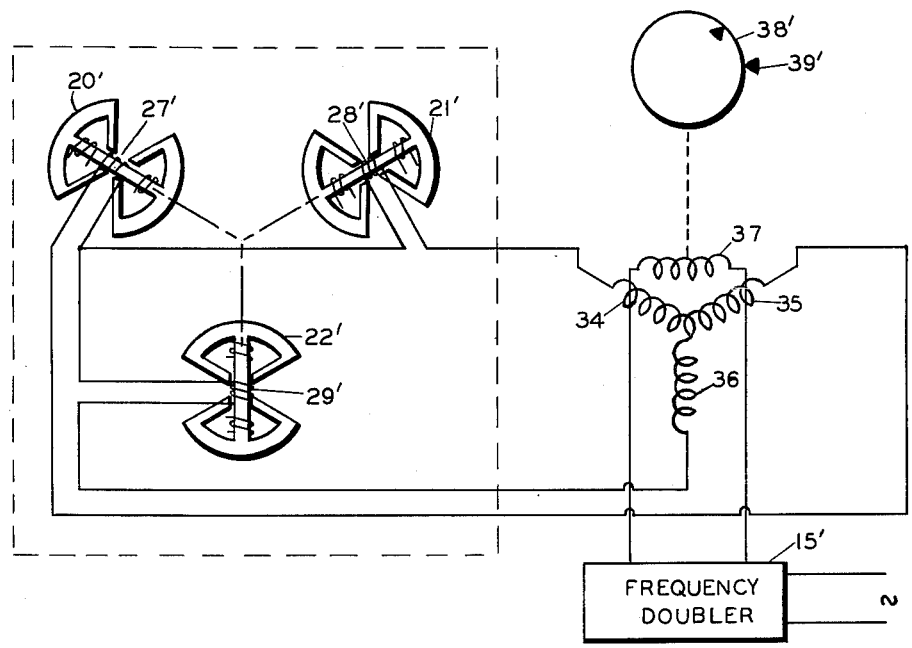
*INVENTOR.*
LENNOX F. BEACH
BY Herbert H. Thompson
HIS ATTORNEY Patented Aug. 28, 1945

2,383,459

UNITED STATES PATENT OFFICE 2,383,459

INDICATOR FOR MAGNETIC FIELDS

Lennox F. Beach, Longmeadow, Mass., assignor to Purves Corporation, Springfield, Mass., a corporation of Massachusetts Application July 30, 1940, Serial No. 348,582

12 Claims. (Cl. 33—204)

This invention relates to systems responsive to the intensity and direction of a magnetic field, more particularly, to systems employing static means for producing electrical potentials variable in magnitude with change of intensity or direction of the field and circuits for utilizing these potentials to actuate indicating or power controlling devices.

In U. S. Patent 2,047,609, issued to Haig Antranikian, July 14, 1936, there is disclosed a method of measuring the direction and intensity of a steady or slowly varying magnetic field by applying to an inductor member or members of magnetically permeable material carrying the flux of the field, a magneto-motive force induced by periodically varying direct current in a primary or exciting winding. This magneto-motive force being added to the field magneto-motive force produces a distorted alternating flux wave in which peaks in one direction are cut off or flattened due to the non-linear magnetic characteristic of the inductor material, the amount of distortion varying with the intensity of the steady field.

Such distortion of a flux wave is commonly explained on the basis of "saturation" of the iron or other permeable material. However, it should be noted that distortion may be of different degrees depending on the portion of the magnetization curve covered and it is not necessary in all cases that complete "saturation" be attained in order to detect or measure a steady field.

According to the present invention an improved type of inductor is provided and by the use of an alternating or pulsating exciting magneto-motive force of suitable magnitude, a measure of the steady magnetic "bias" produced in the inductor by the field is obtained whether or not the inductor becomes completely "saturated." A measuring system without the rotating inductor of the well known inductor compass is thus provided which may, in one form, be adapted to provide remote indications of the direction of a field by simultaneously measuring a plurality of components of the field and utilizing them in an indicating system similar to a "Selsyn" transmission system in which the remote indicating device vectorially combines the components to reproduce the direction of the original field. As adapted to compass indication, the horizontal component of the earth's field is the vector whose direction is reproduced.

One object of the invention is to provide a remote indicating system responsive to the direction of a magnetic field which employs a sensitive pick-up device or transmitter without a rotating inductor member.

Another object is to provide a system for supplying a plurality of electrical potentials proportional, respectively, to components of a magnetic field for actuating a direction indicating instrument of the "Selsyn" type.

Another object is to provide a system in which alternating potentials proportional to a magnetic field or components thereof are produced by periodically varying the magnetic properties of a permeable member or members by static means.

A further object is to provide in systems of the above types an improved form of inductor or permeable member and associated potential producing means.

More specifically, it is an object of this invention to provide an improved inductor device comprising a core of magnetically permeable material and associated windings for supplying an improved signal voltage or voltage output which is dependent in magnitude and phase sense upon the position of the device in an external unidirectional magnetic field.

Still another object is to provide a remote indicating compass system having the advantages of direction indicating systems of the aforementioned types.

Other objects and advantages will become apparent as the description proceeds.

Referring to the drawings,

Fig. 1 shows one form of inductor and associated potential producing means according to the invention.

Fig. 2 is a schematic diagram of a self-orienting indicator including the inductor of Fig. 1.

Fig. 3 is a schematic diagram of an indicating system employing a "Selsyn" type indicator.

Fig. 4 is a typical magnetization curve.

Fig. 5 is a diagram illustrative of the mode of operation of the invention.

Figs. 6 and 7 are schematic wiring diagrams.

Fig. 8 is a modification of the system of Fig. 3.

In Fig. 1, reference numeral 1 is applied to a core of magnetic material terminating in arcuate pole pieces 2 and 3 having extensions 2' and 3', respectively, at each end, which serve to form two substantially closed magnetic flux paths, as for example the one including the left half of core 1, pole piece 3 and the two extensions 3' thereof. A similar and symmetrically located closed path includes the right half of core 1. Pole pieces 2 and 3 serve as collectors of the flux of the field to which the device is subjected. Flux due to the field is represented by the light arrows in Fig. 2 and is shown as having a direction from left to right. The paths mapped by the arrows illustrate the concentration of flux into the central core of the inductor.

Surrounding core 1 are two primary exciting windings 4 and 4' supplied with alternating current from a source of suitable voltage and frequency 7'. The flux induced by each winding circulates in one of the closed paths traced above and the two windings are connected so that in core 1 the instantaneous fluxes oppose and, in the absence of flux due to an external field, neutralize one another. For example, at a particular instant the excitation of winding 4 produces flux which circulates through the right half of core 1 from left to right, pole piece 2 and extensions 2' thereof, as shown by the dark arrows in Fig. 2, while the excitation of winding 4' at the same time results in the circulation of flux through the left half of core 1 from right to left, pole piece 3 and extensions 3'. Arrows representing the latter flux are not shown to avoid confusion in the figure. It is seen from the direction of the arrows that at the instant chosen for illustration the field flux and exciting flux are in the same direction in the right half of core 1. At the same instant the two fluxes in the left half of core 1, if shown, would be found to oppose one another, these conditions being interchanged as the alternating excitation reverses. Surrounding windings 4 and 4' is a secondary or pick-up winding 5 carried by a tubular member 6 axially slidable with respect to windings 4 and 4'.

The generation of a voltage proportional to a magnetic field by the forms of the invention shown in Figs. 1 and 2 is as follows: Considering first the exciting flux alone, the excitation of winding 4 from A. C. source 7' produces alternating flux in the right-hand closed magnetic circuit which may be represented by the flux wave 7 of Fig. 5. This wave, if saturation is not approached, is of substantially sinusoidal form and is so shown to simply the explanation. The corresponding flux in the left-hand closed magnetic circuit due to the A. C. excitation of winding 4' may be represented as flux wave 8, the two waves 7 and 8 being of the same form but of opposite phase, thereby neutralizing one another and resulting in zero net flux in core 1.

This condition will be more clearly apparent by reference to Fig. 4 which shows a typical magnetization curve for iron, abscissas representing magnetizing force (H) and ordinates representing flux density (β). When the device is not subjected to a steady field, the working point of the magnetic material (neglecting hysteresis) will be controlled so that it fluctuates along the magnetiziation curve in a region where equal and opposite changes in H produce equal and opposite changes in β, for illustration, from G to G'. It will be seen from the curve that the peak flux densities AG and A'G' produced by equal and opposite magnetizing forces OA and OA' are equal. Assume now that the device is subjected to a steady field which moves the average working point to some position such as P. Since the curve is not symmetrical on opposite sides of P, excursions in opposite directions from this point produce different peak flux densities in the core as shown by the two ordinates PD and P'D'.

As a simplified illustration of the effect of this non-linearity on the flux wave, Fig. 5 shows the line 9 which sharply cuts off the lower halves of waves 7 and 8 and corresponds to a discontinuous magnetization curve having a horizontal portion joined to the inclined portion without intermediate curvature as illustrated by the broken line curve PEF of Fig. 4. The opposing flux waves being no longer the same, a resultant flux appears in core 1 which is represented by the curve 10 of Fig. 5. From the shape of this curve, it will be apparent that the flux which it represents includes a steady component and an alternating component having a frequency twice that of the A. C. exciting magneto-motive force, the alternating component being shown by the curve 10'. The steady component reduces to zero when the device is oriented so that the axis of core 1 is perpendicular to the direction of the field, i. e., when the steady field component becomes zero and reverses as to polarity when this position is passed through. Similarly, the double frequency alternating component of the resultant flux reduces to zero at the null position and reverses in phase with passage through this position.

It will be apparent to one skilled in the art that the operation of the device is analogous to that of an electric rectifier of the balanced or full wave type in which similar steady and double frequency components appear in the output. In operation, the combined alternating and steady components of the magnetizing force must therefore reach peak values in one direction extending into the non-linear region of the magnetization curve so that "rectification" may occur and an output be obtained. In order therefore to detect magnetic fields of even the weakest intensity the peaks of the flux due to the alternating or pulsating exciting magneto-motive force in one direction should reach a point immediately adjacent the non-linear region of the curve or extend into that region while peaks in the opposite direction should preferably be on the linear portion of the curve. When the above condition is fulfilled, opposite ends of core 1 will be "saturated" during alternate half cycles of exciting magneto-motive force as shown in the lower half of Fig. 4.

The double frequency component of the core flux induces a voltage in winding 5 whose phase likewise depends on which side of the null position the axis of the inductor lies. To prevent any voltage being induced in winding 5 due to the exciting current, the sliding adjustment of tube 6 permits this winding to be placed in a position relative to the exciting windings 4 and 4' such that the effects of the currents in windings 4 and 4' on winding 5 are equal and opposite, that is, the normal mutual inductance between winding 4 and 5 is the same as that between 4' and 5' but of opposite sign.

It will be further apparent, more particularly by consideration of the flux arrows of Fig. 2, that substantially the maximum amplitude of periodically varying exciting flux occurs in all portions of the inductor including the flux collectors and when this flux is alternating in nature, that is, reverses its direction periodically, it exerts a decided demagnetizing effect tending to free the inductor from residual uni-directional magnetization which might in some cases cause a false response of the instrument.

In Patent 2,047,609, referred to above, there is shown means for orienting a multiple core inductor to a position of zero net output. Similarly, the single core inductor of Fig. 1 of the present application may be utilized in a self-orienting indicator using motive means responsive to the output of pick-up coil 5. One method of orienting such an inductor is shown in Fig. 2 where the inductor of Fig. 1 is mounted on a rotatable support 11 which is preferably angularly positioned by a two-field reversible D. C.

motor 12 through a worm 13 meshing with teeth on the periphery of support 11. Motor 12 is controlled by applying the reversible phase output of coil 5 to a phase sensitive rectifier 14 which may be of the type shown in Patent 2,088,654, issued August 3, 1937, to H. L. Hull and there illustrated more particularly by tubes 23 and 24 and associated circuits of Fig. 1.

In order to bias the tubes of such a phase detector, an A. C. supply of the same frequency as the signal or incoming wave is applied to the grids and this is illustrated as the frequency doubler 15 connected to A. C. supply 7'. The circuit of the doubler 15 is that of device 15' shown in detail in Fig. 3 and is similar to a known full wave rectifier circuit except that the double frequency A. C. "ripple" is utilized as the output, the D. C. component in this case being blocked by condensers 16 and 16'. It is to be understood that phase adjusting circuits may be necessary to supply the double frequency voltage output from frequency doubler 15 to phase detector 14 in a suitable phase relationship to the signal voltage. The output current of phase detector 14 which reverses as to direction with reversal of input phase is applied to differential relay 17 operable from a neutral position to close armature 18 against either right-hand contact 19 or left-hand contact 19' and thereby supply current to one of the two fields of reversible motor 12 according to the direction in which said motor is to operate.

The operation of the modification shown in Fig. 2 will be apparent from consideration of the diagram. The earth's field enters and leaves core 1 by way of the collectors or pole pieces 2 and 3 as shown by the light arrows. The circulation of the exciting flux in one of the two low reluctance paths formed by a pole piece, its extensions and a portion of the core is shown by the heavy arrow. The net flux in core 1 induces a voltage in coil 5 which controls the operation of motor 12. Motor 12 operates to rotate support 11 and the inductor mounted on it to a position such that the axis of core 1 is perpendicular to the direction of the earth's or other magnetic field, in which position, no signal is applied to differential relay 17 and motor 12 comes to rest. The angular position of support 11 may be indicated by index 40 readable on scale 41. While for purposes of illustration a particular arrangement of orienting means has been described, other known means are equally adapted for use with the improved inductor of Fig. 1.

In the modification shown in Fig. 3, a plurality of permeable cores or inductors is employed to generate potentials proportional to components of a magnetic field. As an illustration, Fig. 3 shows three sets of cores or inductors 20, 21 and 22 positioned at angles of 120° with one another for measuring the components of the field in the directions of their respective axes. These inductors may be in the form of straight bars as shown in the aforementioned Patent 2,047,609, or preferably in the improved form shown in Fig. 1 of the present application. This form of inductor provides substantially closed magnetic circuits for the exciting flux, which, in addition to advantages pointed out in the above patent in connection with similar forms of magnetic circuits, renders the device insensitive to extraneous alternating fields. Inductors, 20, 21, and 22 each have two symmetrically located exciting windings as for example 23 and 23' on inductor 20, all the exciting windings being connected to A. C. source 26. In addition, the three cores have pick-up windings 27, 28 and 29, respectively, which are shown as being Y connected, the outer terminals of the Y being connected to conductors 30, 31 and 32 of a transmission line. The form of the voltage wave induced in each of the pick-up windings is similar to that induced in winding 5 of Figs. 1 and 2 and the frequency is double that of the source 26. Since the voltages across the three lines 30, 31 and 32 are proportional to three symmetrical components of the magnetic field they may be utilized to reproduce the direction of the field at a distant point as is done in the usual type of "Selsyn" system and for this purpose a "Selsyn" receiver 33 comprising a three-phase stator winding 34, 35 and 36, and a single-phase rotor winding 37 is shown. Winding 37 is supplied with current of twice the frequency of supply 26 through frequency doubler 15' and will therefore align its axis with the resultant of the three component fields due to the currents in the three stator windings. If needed, means for adjusting the phase of the output of doubler 15' may be provided. There is shown connected to rotor winding 37 a compass card 38, readable by means of an index 39 to indicate the direction of the field to which the transmitter is subjected. It will be understood that by rigidly connecting rotor 37 to a power driven object which is to be aligned in the direction of the magnetic field, receiver 33 may also be utilized as a "Selsyn" signal generator to generate a voltage proportional to the misalignment of said object with the field for controlling the driving means as is well known in the art of positional control systems employing "Selsyn" type receivers.

While for purposes of illustration, there is shown in the drawings a remote control system which depends upon resolving the magnetic field at the transmitter into three components, the plurality of field components referred to is not limited to three, instruments being known for utilizing other numbers of components, for example, two rectangular components.

It will be apparent that the improved inductor of Fig. 1 is particularly suitable as an element in a transmitter in a remote indicating system of the types above described. Such use of this inductor in a three component transmitter is illustrated in Fig. 8. In this figure, three inductors 20', 21' and 22', each similar in construction to that shown in Fig. 1, are symmetrically arranged as a transmitter and their pick-up or secondary windings 27', 28' and 29' are connected to a "Selsyn" receiver comprising the stator windings 34, 35 and 36, connected in polycircuit fashion as in the receiver 33 shown in Fig. 3. For simplicity, the connections of the exciting windings on these inductors with an A. C. source are omitted.

The output of the voltage generating or pick-up coil of a single inductor may be connected to suitable indicating means and an indication obtained proportional to that component of the field to which the inductor is subjected which is along the axes of the inductor. Suitable indicating means are shown in Figs. 6 and 7. In Fig. 6 the output voltage of coil 5 across points A and B is applied by way of points A' and B', respectively, to a phase detector which may be of the type shown at 14 in Fig. 2 and the reversible polarity direct current obtained from this detector applied to a zero center meter 45 which may be calibrated to indicate the sense and magnitude of the component field.

Alternatively the voltage across points A and B may be applied by way of points A″ and B″ (Fig. 7) to a movable coil 48 of a conventional dynamometer type instrument 46 having a fixed coil 47 supplied from an A. C. source of fixed phase. Pointer 49 will then be deflected in accordance with the sense and magnitude of the field.

By the arrangements of Figs. 6 and 7 a magnetic field exploring device is provided which furnishes a direct indication on a meter of the magnitude and sense of the component along the inductor axis of the field in which the inductor is placed. By turning the inductor until a maximum indication is obtained, it is known that the direction of the field coincides with the axis of the inductor. By turning the inductor to obtain a null indication, a check may be obtained since in this position the direction of the field is perpendicular to the inductor axis. In either of the two arrangements illustrated the meter may be calibrated directly in terms of field strength.

While in the explanation of the operation of the improved inductor of the present invention, reference has been made to the magnetization curve of iron, it will be understood by those skilled in the art that the more permeable ferrous alloys such as "permalloy," "hypernik," etc., may be substituted for iron in the construction of the devide. Certain of these alloys are particularly useful in practicing the present invention since their magnetization curves have sharper breaks than the curve for iron, that is, they more nearly approach the dashed line PEF of Fig. 4 and so provide a sudden transition from a non-saturated to a saturated or nearly saturated condition, which is an aid in securing sensitivity.

Also, while the description refers chiefly to the use of exciting M. M. F.'s due to alternating currents, it will be understood that any periodically varying exciting current including pulsating direct current may be employed to produce these M. M. F.'s since a pulsating direct current has an alternating component or components, the steady component merely supplying an additional biasing M. M. F.

The present invention, among other important applications, is particularly adapted to be used as a remote indicating compass on moving vehicles, for example, aircraft, where the simple, compact and rugged construction of the inductor pick-up due to the absence of moving parts and the fact that it is unaffected by acceleration or vibration is of great importance. Another advantage is the ability to locate the pick-up in that part of the craft least affected by disturbing magnetic fields and actuate from it an indicator or a plurality of indicators in suitable locations, no care being required to maintain the pick-up in operative condition. Where multiple indicators are used, amplifying means may be inserted in the transmission line if necessary to supply more power than can be taken from the pick-up. Also with a single or with multiple indicators an amplifier may be used to prevent reaction of the indicator or indicators on the pick-up.

It will be further understood that in any of the forms of the invention employing remote indicators, such indicators may be oriented initially to position the stationary coils thereof in suitable relationship to the axes of the inductors of the pick-up.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim and desire to secure by Letters Patent is:

1. A magnetic field sensitive device comprising a winding, permeable core means having a non-linear magnetic characteristic linked with said winding and adapted to receive a uni-directional flux when subjected to an external uni-directional magnetic field, coil means for inducing two opposed alternating saturating fluxes of fundamental frequency in said permeable means, said fluxes being instantaneously equal in magnitude and having peak values such that the resultant flux wave in said permeable means due to said uni-directional and varying fluxes in combination is unsymmetrical with respect to the axis of zero flux by virtue of said non-linear characteristic, said coil means being positioned relative to said winding for balancing out E. M. F.'s of fundamental frequency induced in said winding.

2. In apparatus for obtaining a measure of the strength of a magnetic field by the saturation of a permeable core, an elongated core, a source of A. C., a pair of axially spaced exciting windings completely surrounding said core for producing flux therein and connected to said source for excitation in opposition and a third coil likewise completely surrounding said core and positioned along the axis thereof relative to said two exciting coils for balancing the voltages induced in said third coil by said two exciting coils, said third coil receiving a voltage only in proportion to the saturation effect produced in said core by said field.

3. In a device sensitive to a magnetic field, an inductor for receiving the flux of the field, said inductor including an elongated core comprising permeable material having a non-linear magnetic characteristic, means for applying to portions of said core spaced along the major axis thereof a pair of opposed periodically varying exciting magneto-motive forces instantaneously equal in magnitude, and coil means receiving an electromotive force responsive to variation of flux in said core, said coil means being constructed and arranged to be insensitive to flux in said core resulting from said opposed magneto-motive forces when acting alone, but sensitive to the joint effect of said magneto-motive forces and the magnetic field and in proportion to the magnitude of the field, due to the non-linear characteristic of the core material.

4. In a magnetic field responsive device, an inductor for receiving the flux of the field comprising an elongated core of permeable material, flux collectors at opposite ends of said core for concentrating an external field in said core, means forming two magnetic circuits of low reluctance each including a portion of said core and a flux collector, and means for producing substantially equal alternating exciting fluxes in said low reluctance circuits, said fluxes being instantaneously in opposite directions in said core whereby the material of said core portions and said flux collectors is subjected to periodic reversals of magnetization, and a coil associated with said core for receiving an induced electromotive force responsive to variation of resultant flux in the core, said resultant flux being a periodically varying flux proportional in average value to the strength of the field along the axis of said core and reversible in phase with reversal of said field.

5. In a device responsive to a uni-directional magnetic field, an inductor for receiving the flux of the field including an elongated core of high permeability material having a non-linear magnetic characteristic, means for periodically inducing opposing exciting fluxes in two portions of said core, permeable means extending laterally from said core at the ends of said portions and functioning jointly as collectors of the field flux and as low reluctance flux paths for said exciting fluxes, and a coil associated with said core, whereby an electromotive force is produced in said coil in accordance with the strength of the field when the flux of said uni-directional field is non-linearily combined with the exciting fluxes.

6. In a magnetic field responsive device, an inductor for receiving the flux of the field comprising an elongated core portion of permeable material, lateral extensions at the ends thereof, and permeable means other than said core portion for returning flux carried by said extensions to a central portion of said core portion, an A. C. source, a pair of coils associated with said core portion and excited from said source, said coils being connected to apply equal and opposite magneto-motive forces to said core portion and the two fluxes due to said opposite magneto-motive forces causing flux to circulate in independent low reluctance magnetic circuits each including one of said core extensions and the flux return path therefrom, a third coil associated with said core portion and inductively related to said exciting coils, said third coil being adjustable axially of said elongated core to a position such that equal and opposite voltages are induced therein by the excitation of said exciting coils.

7. A self-orienting magnetic field direction indicator adapted to function as an earth inductor compass comprising an elongated inductor having an elongated core for receiving flux of a field, such as the earth's field, an alternating current source, means for magnetically exciting said core from said source comprising coil means constructed and arranged to apply to the entire sectional area of said core opposite alternating magneto-motive forces in series directed along the major axis thereof, said alternating magneto-motive forces in combination with the said field magneto-motive force at least partially saturating said core during a half cycle and thereby producing a flux wave of double the frequency of said source, said wave thereby being reversible as to phase with reversal of the direction of the field, a coil associated with said core and having its windings arranged in inductive relation to the core zones to which said opposite alternating magnetomotive forces are applied and connected together to balance out E. M. F.'s induced therein by said alternating magneto-motive forces but to add together the double frequency E. M. F. components induced therein through interaction with the earth's field, a rotatable support for said inductor, motive means for angularly positioning said support, control means for driving said motive means in a direction corresponding to the phase of said electromotive force and direction indicating means turnable with said support.

8. A device sensitive to an external magnetic field comprising a core of permeable magnetic material, means for producing periodically varying, exciting fluxes in adjacent zones of said core having respectively opposite, bucking directions of flow in said core for instantaneous values thereof, and a pick-up coil associated with said core in the zone of adjacency of said core zones, said pick-up coils having the convolutions thereof so constructed and relatively connected that voltage components induced in said pick-up coil by said exciting fluxes will balance out while voltage components produced therein through interaction with the external field will be additive.

9. A device sensitive to an external magnetic field comprising a core of permeable magnetic material, a pair of substantially coaxially arranged coils associated with said core for producing therein two periodically varying, exciting fluxes having opposite directions of flow for instantaneous values thereof, and a pick-up coil associated with said core in the zones thereof wherein said opposing fluxes flow, said pick-up coil having the convolutions thereof so constructed and relatively connected that voltage components induced in said pick-up coil by said exciting fluxes will balance out while voltage components produced therein through interaction with the external field will be additive.

10. A device sensitive to an external magnetic field comprising a core of permeable magnetic material, a pair of exciting coils mounted on said core to produce periodically varying, exciting fluxes in adjacent zones of said core having respectively opposite directions of flow in said core for instantaneous values thereof, and a pick-up coil extending about both of said exciting coils, said pick-up coil having the convolutions thereof so constructed and relatively connected that voltage components produced therein through interaction with the external field will be additive while voltage components produced therein by said exciting fluxes will oppose each other, whereby said pick-up coil as a unit may be shifted axially of said core and exciting coils to provide substantially equal and opposing voltage components induced in said pick-up coil by said exciting fluxes.

11. In a device sensitive to a magnetic field, a core of permeable magnetic material, means for producing exciting fluxes flowing in opposing, bucking relationship for instantaneous values thereof in said core, a pick-up winding encircling said core in the zone thereof wherein said fluxes buck, said winding having the convolutions thereof so constructed and relatively connected that voltage components produced therein through interaction with said magnetic field will be additive while voltage components produced therein by said exciting fluxes will oppose each other, and core means forming a magnetic path for conducting said fluxes into close proximity to the exterior of said pick-up winding.

12. In a device sensitive to a magnetic field, a core of permeable magnetic material including a substantially straight portion, a pick-up winding mounted on said core portion, means forming magnetic paths extending from said core portion on opposite sides of said pick-up winding and respectively into close proximity to the exterior of said pick-up winding between the center of said pick-up winding and the ends thereof, and means for producing exciting fluxes circulating through said magnetic paths and straight core portions, respectively, but flowing in opposite directions for instantaneous values thereof in said core portion.

LENNOX F. BEACH.